United States Patent [19]
Kobayashi et al.

[11] Patent Number: 5,992,155
[45] Date of Patent: Nov. 30, 1999

[54] NOTEBOOK COMPUTER STORAGE CASE

[75] Inventors: Takashi Kobayashi; Takashi Nonaka; Noriaki Sumi; Kunio Nakaoka, all of Tokyo, Japan

[73] Assignee: Mitsubishi Denki Kabushiki Kaisha, Tokyo, Japan

[21] Appl. No.: 09/047,995

[22] Filed: Mar. 26, 1998

[30]     Foreign Application Priority Data

Mar. 27, 1997   [JP]   Japan ..................................... 9-075178

[51] Int. Cl.⁶ ............................ F25B 21/02; F28D 15/00; H05K 5/00; G06F 1/16
[52] U.S. Cl. ...................... 62/3.7; 62/259.2; 165/104.33; 361/687; 364/708.1
[58] Field of Search ........................... 62/3.2, 3.7, 259.2, 62/3.62; 165/104.21, 104.33; 361/687, 704, 707; 364/708.1

[56]                References Cited

U.S. PATENT DOCUMENTS

| | | | |
|---|---|---|---|
| 4,736,332 | 4/1988 | Crease | 364/708 |
| 5,383,340 | 1/1995 | Larson et al. | 62/259.2 |
| 5,621,613 | 4/1997 | Haley et al. | 361/687 |
| 5,704,212 | 1/1998 | Erler et al. | 62/3.2 |
| 5,757,615 | 5/1998 | Donahoe et al. | 361/687 |
| 5,761,034 | 6/1998 | Chu | 361/687 |
| 5,862,392 | 1/1999 | Charkey et al. | 395/750.01 |

*Primary Examiner*—William Doerrler
*Attorney, Agent, or Firm*—Leydig, Voit & Mayer, Ltd.

[57]                 ABSTRACT

A case appropriate for holding a notebook computer for use of the notebook computer while held in the case. The notebook computer storage case uses a member with high thermal conductivity at least in a position contacting the bottom of a computer located in the case.

16 Claims, 15 Drawing Sheets

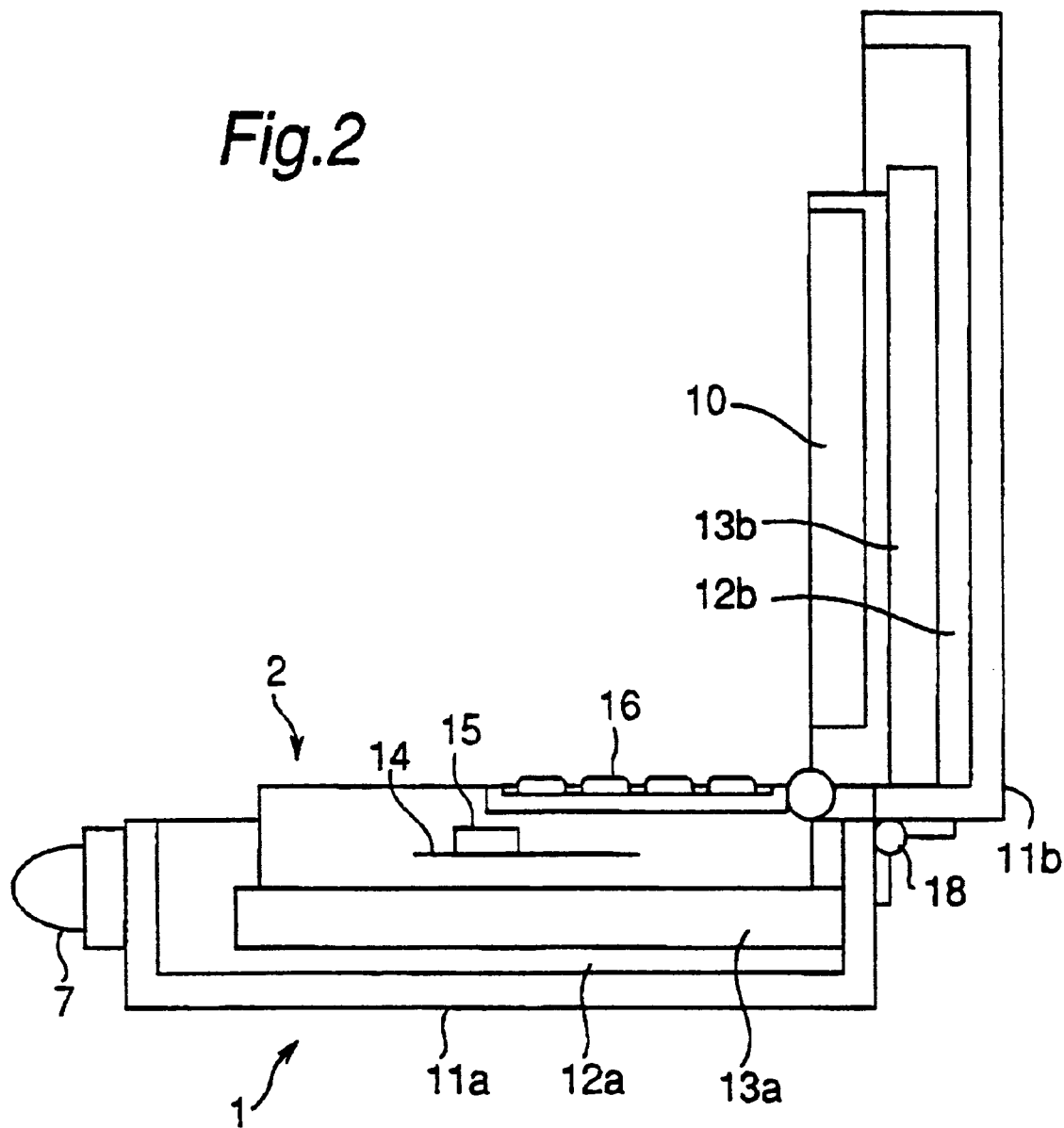

NOTEBOOK COMPUTER STORAGE CASE

BACKGROUND OF THE INVENTION

1. Field of the Invention

The present invention relates to a storage case for storing and transporting a notebook computer.

2. Description of Related Art

A notebook computer, a personal computer of a generally notebook size, are generally placed inside a briefcase or attache case for transportation by the user. FIG. 15 is a schematic side sectional view of a notebook computer 600 that is housed in a carrying case 500 of a design intended for use in carrying a camera and camera equipment. The carrying case 500 is substantially made of an aluminum, duralumin, or other lightweight metal and includes shell members 501a and 501b, a cushioning material 502a and 502b disposed inside each of the shell members 501a and 501b for absorbing external shocks applied to the shell members. The shell members 501a and 501b selectively open and close relative to each other about a hinge 503.

In FIG. 15, a top cover of the notebook computer 600 where a liquid crystal display (LCD) panel 601 is installed is shown as opened ready for use. A handle 504 is provided on the side from which the notebook computer 600 is placed into the carrying case 500. The LCD panel 601, which is functionally equivalent to the top cover of the notebook computer 600, can be positioned at any desired angle by means of a clutch member 602 having a clutch mechanism.

When a notebook computer 600 housed in the carrying case 500 of the structure described above is to be used, the following problems arise. Specifically, heat generated by the CPU 604 and other electronic components mounted on a printed circuit board 603 inside the notebook computer 600 is partially dissipated through an aluminum sheet disposed across the back of the keyboard 605, and partially absorbed by the cushioning material 502a through the bottom of the notebook computer 600. Heat generated by the LCD panel 601 is likewise partially absorbed by the cushioning material 502b. Most cushioning materials, however, are not good heat conductors, and thus do not efficiently dissipate heat. As a result, heat conducted below the circuit board through the bottom of the notebook computer 600 tends to build up inside the carrying case, thus heating the notebook computer 600 and LCD panel 601.

SUMMARY OF THE INVENTION

Therefore, an object of the present invention is to provide a storage case designed to permit the user to use a notebook computer while the computer is accommodated within the case.

To achieve this object, a notebook computer storage case for housing a notebook computer uses a material with high thermal conductivity inside an outer shell of the case and contacting at least a bottom surface of said notebook computer. This high thermal conductivity material can also be used for both the outer shell of said case and inside said outer shell.

One or a plurality of air space layers can be further provided in a member disposed inside an exterior shell of said case. The air space layer is parallel to a bottom of the case, and has a ventilation opening on one end thereof.

A heat collector can be disposed inside a member provided inside an exterior shell of said case such that the heat collector contacts a heat-emitting part of the notebook computer. A heat pipe conducts heat collected by the heat collector, and a heat radiator connected to the heat pipe radiates heat outside the case. The heat radiator can be alternatively disposed in a top cover of the case.

A cavity contacting the bottom of the notebook computer can be provided in a member disposed inside an exterior shell of said case. The cavity comprises an air outlet, and a fan is provided for expelling air inside the cavity through the air outlet A cooling device can also be provided directly below a heat emitting part of the notebook computer.

The exterior of the case shell can also be coated with a coating having high reflectivity and a low absorption index to light in the sunlight spectrum.

In any event, by using a thermally conductive member in at least that part of the shell that is in contact with the bottom of the notebook computer as described in the first embodiment of the invention above, heat emitted by the notebook computer is absorbed by the thermally conductive member, dissipated throughout said member, and then radiated outside the case. As a result, an excessive build up of heat inside the case when the notebook computer is used while in the case can be prevented, and the notebook computer can be prevented from overheating.

Furthermore, by using a thermally conductive material for both the case shell and the lining therein as described in the second embodiment of the invention, heat emitted from the notebook computer when the notebook computer is used while in the case can be quickly radiated outside the case, and the notebook computer can again be prevented from overheating.

As described in the third embodiment above, heat emitted from the notebook computer when used inside the case can be quickly and efficiently vented from the case by providing inside the shell in which the body of the notebook computer is housed one or more layers of air spaces parallel to the bottom of the notebook computer with an opening on at least one end. In addition to preventing the notebook computer from overheating during such use, this embodiment further affords more comfortable laptop use of the case by preventing the case itself from becoming hot.

A heat pipe and heat collector can be further provided in the case shell below the notebook computer bottom as described in the fourth embodiment, and in the case shell covering the LCD panel part of the notebook computer as described in the fifth embodiment. While using a mechanism different from that described in the preceding embodiments to collect and remove heat from inside the case. the benefits of said heat removal are substantially the same as those described above.

An air space with one an air outlet on one end and an opening in which a fan can be disposed on another end can be further be disposed in the case shell below the bottom of the notebook computer as described in the sixth embodiment above. Air heated by heat emitted from the notebook computer can thus be forced from the air space by the fan, and the case can thus be force-cooled. It is thus again possible to prevent the case bottom from becoming hot, and the notebook computer can be used comfortably while housed in the case held on the lap.

A cooling device can be further disposed directly below the heat-emitting part of the notebook computer to force-cool and remove locally generated heat as described in the seventh embodiment above. The same benefits described above are again achieved, Heating of the case by exposure to sunlight can also be suppressed by coating the case exterior with a highly reflective coating that is also a poor absorber of the sunlight spectrum as described in the eighth embodiment of the invention.

Heating of the LCD panel disposed in the top cover of a notebook computer can also be prevented by providing a space in the case shell where the LCD panel 10 is housed as described in the ninth embodiment above.

By providing a linking mechanism as described in the tenth embodiment above, the top of the notebook computer and the top shell of the case can be opened and closed in unison for even greater convenience.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 is a side view cross section of a case according to a first embodiment of the present invention with a notebook computer stored therein;

DESCRIPTION OF THE PREFERRED EMBODIMENTS

A notebook computer storage case according to the present invention specifically uses a surface of the case as a heat radiation surface. This can be achieved in various ways as described with reference to the accompanying drawings showing different preferred embodiments 1 through 10 of the present invention below.

Embodiment 1

Figure 1A:
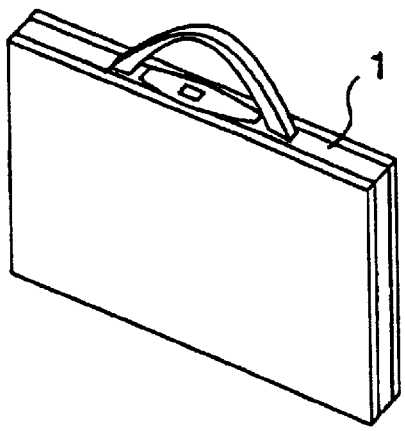
FIG. 1A is a perspective overview of a case according to a first embodiment of the present invention.
Figure 1B:
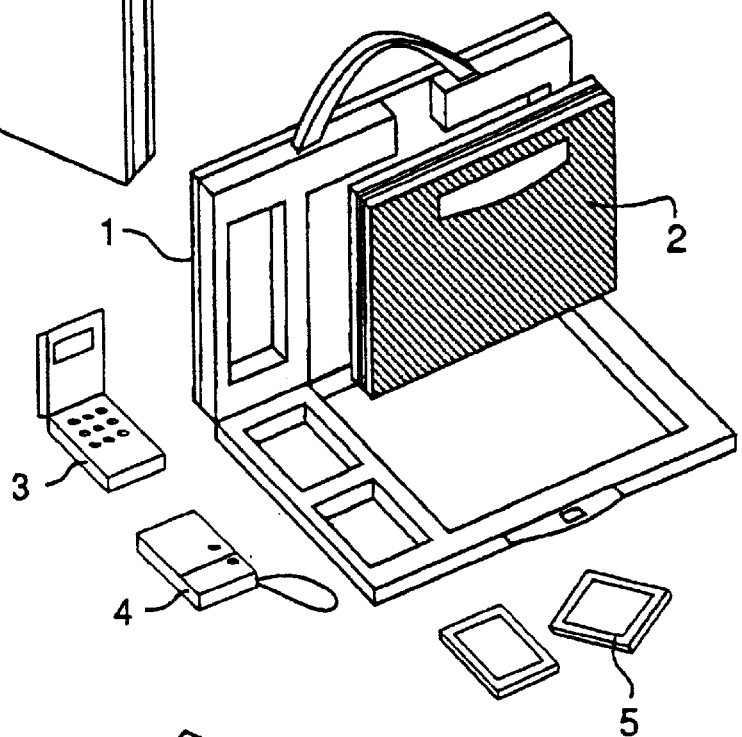
FIG. 1B is a view of items that can be stored in the case.
Figure 1C:
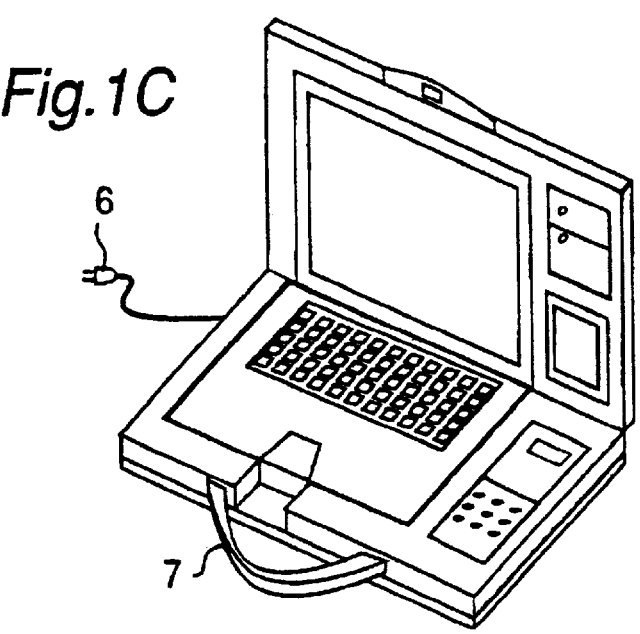
FIG. 1C is a view of said items stored in said case.

FIG. 1A is a perspective overview of a case 1, in a closed condition, according to a first embodiment of the present invention. FIG. 1B is a view of the case 1 in an opened condition, with some items shown in a condition ready to be stored in the case 1 together with a notebook computer. Note that pockets or recesses for holding a notebook computer 2, a cellular telephone 3, a digital still camera 4, and one or more PC cards 5, are provided inside the case 1. FIG. 1C is a view of the case 1 in the opened condition with said items stored in their respective pockets together with the notebook computer. Note, further, that the notebook computer 2 is shown with a surface thereof comprising the LCD panel 10, which also functions as a top cover of the notebook computer 2, having been pivoted to an open position. The case 1 further comprises a retractable power supply cord 6. While not shown in the figure, an auxiliary battery can be provided additionally or in substitution for one of the other items shown.

FIG. 2 is a side sectional view of the case 1 shown in FIG. 1C with the notebook computer 2 stored inside the case 1 and the top cover LCD panel 10 thereof pivoted to the open position. As shown in FIG. 2, the case 1 comprises a thermally conductive silicone rubber 13a and 13b between the notebook computer 2 and the cushioning material 12a and 12b disposed inside shells 11a and 11b. Note that this thermally conductive silicone rubber 13a and 13b also provides excellent impact resistance. As a result, thick thermally conductive silicone rubber 13a and 13b can be disposed over a thin cushioning material 12a and 12b as shown in FIG. 2, or can completely replace the cushioning material 12a and 12b.

Heat generated by a CPU 15 mounted on a printed circuit board 14 inside the notebook computer 2 is dissipated through an aluminum sheet provided on the back of the keyboard 16, and is absorbed by and dissipated throughout the thermally conductive silicone rubber 13a. From the thermally conductive silicon rubber 13a, heat passes through the cushioning material 12a and is then radiated from the shell 11a. Heat generated by the LCD panel 10 is likewise absorbed by and dissipated throughout the thermally conductive silicone rubber 13b, passed through the cushioning material 12b, and then radiated from the shell 11b.

As a result, locally-generated heat from the notebook computer 2 is absorbed by and dissipated throughout the thermally conductive silicone rubber 13a and 13b, thus preventing heat build-up inside the case 1, and preventing the notebook computer 2 and LCD panel 10 from overheating.

It should be noted that any thermally conductive material capable of absorbing and efficiently dissipating locally generated heat can be substituted for the thermally conductive silicone rubber 13a and 13b described above. Thermally conductive carbon fiber cloth is one example of such a substitute material.

It should be further noted that a hinge member 18 of the case 1 comprises a clutch mechanism enabling the cover to be opened to any desired angle. The cover of the case 1 can therefore be opened to the same angle as the LCD panel 10 of the notebook computer 2 held inside the case 1, thus affording greater ease of use and convenience. It should also be noted that the cover of each case described in the second through tenth embodiments below is comprised in the same manner.

Considering cases in which the notebook computer user rests the case 1 on the user's lap to use the notebook computer 2, a foam coating approximately 200 μm thick can be applied to all or part of the bottom exterior surface of the case 1, that is, on the exterior surface of shell 11a. While such a coating will slightly reduce heat radiation and therefore result in a higher shell 11a temperature, the sensed temperature can be eased. Such a coating can therefore make laptop use of the case 1 more comfortable. It should be noted here that the cover of each case described in the second through tenth embodiments below can be coated in the same manner.

Embodiment 2

Figure 3:
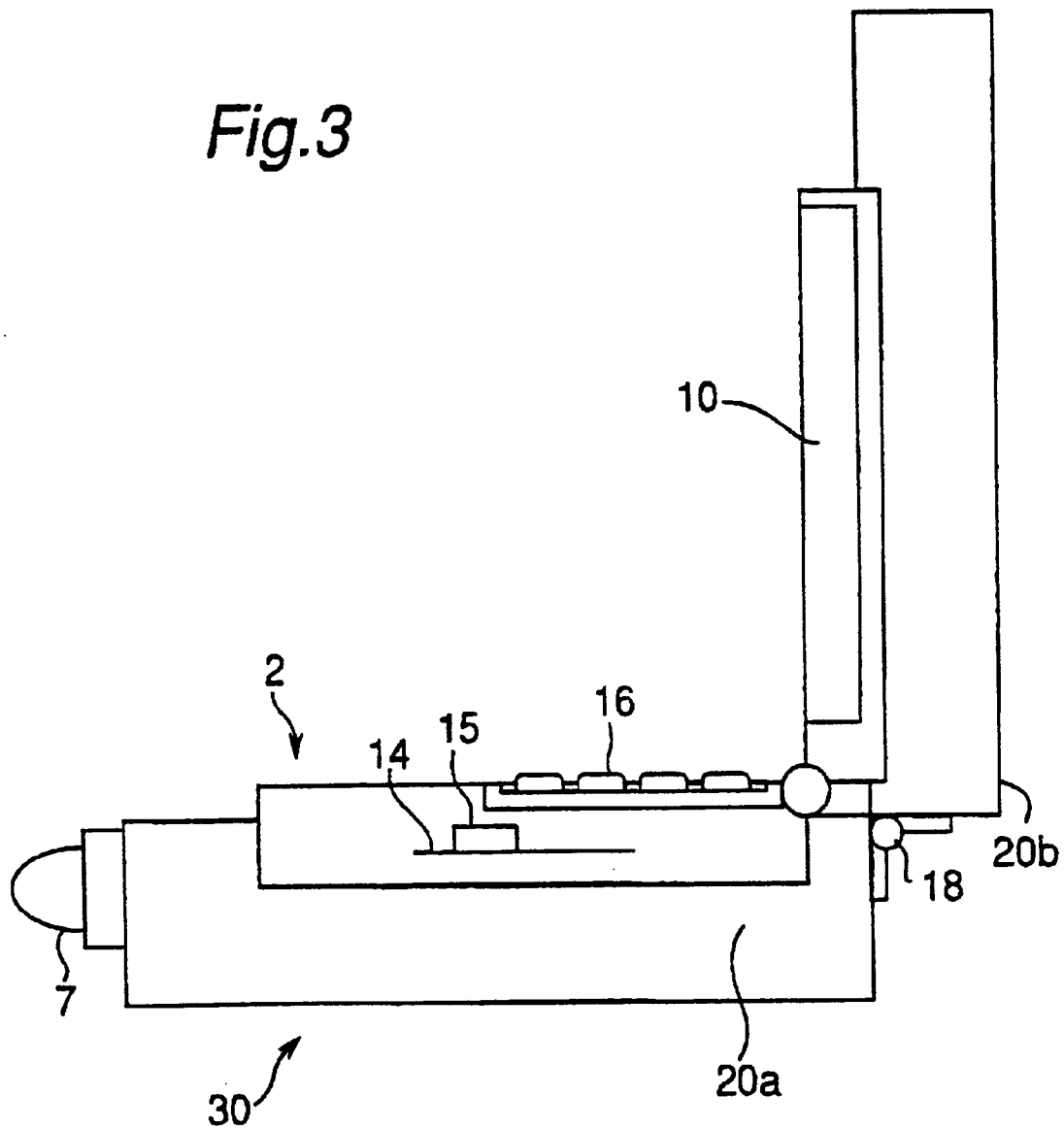
FIG. 3 is a side view cross section of a case according to a second embodiment of the present invention with a notebook computer stored therein.

FIG. 3 is a side sectional view of a case 30 according to a second embodiment of the present invention with a notebook computer 2 stored therein. Note that like parts in the case 30 according to the present embodiment and the case 1 according to the first embodiment are identified by like reference numerals, and further description thereof is omitted below.

This case 30 differs in that a composite material 20a and 20b made with a thermally conductive carbon fiber cloth is used as the shell material of the case 30. Heat generated by the CPU 15 mounted on the printed circuit board 14 inside the notebook computer 2 held in the case 30 is partially absorbed by and dissipated throughout the composite material 20a. Heat generated by the LCD panel 10 is likewise absorbed by and dissipated throughout the composite material 20b.

As a result, heat from the notebook computer 2 is prevented from building up inside the case 30, and the notebook computer 2 is prevented from overheating.

Embodiment 3

Figure 4:
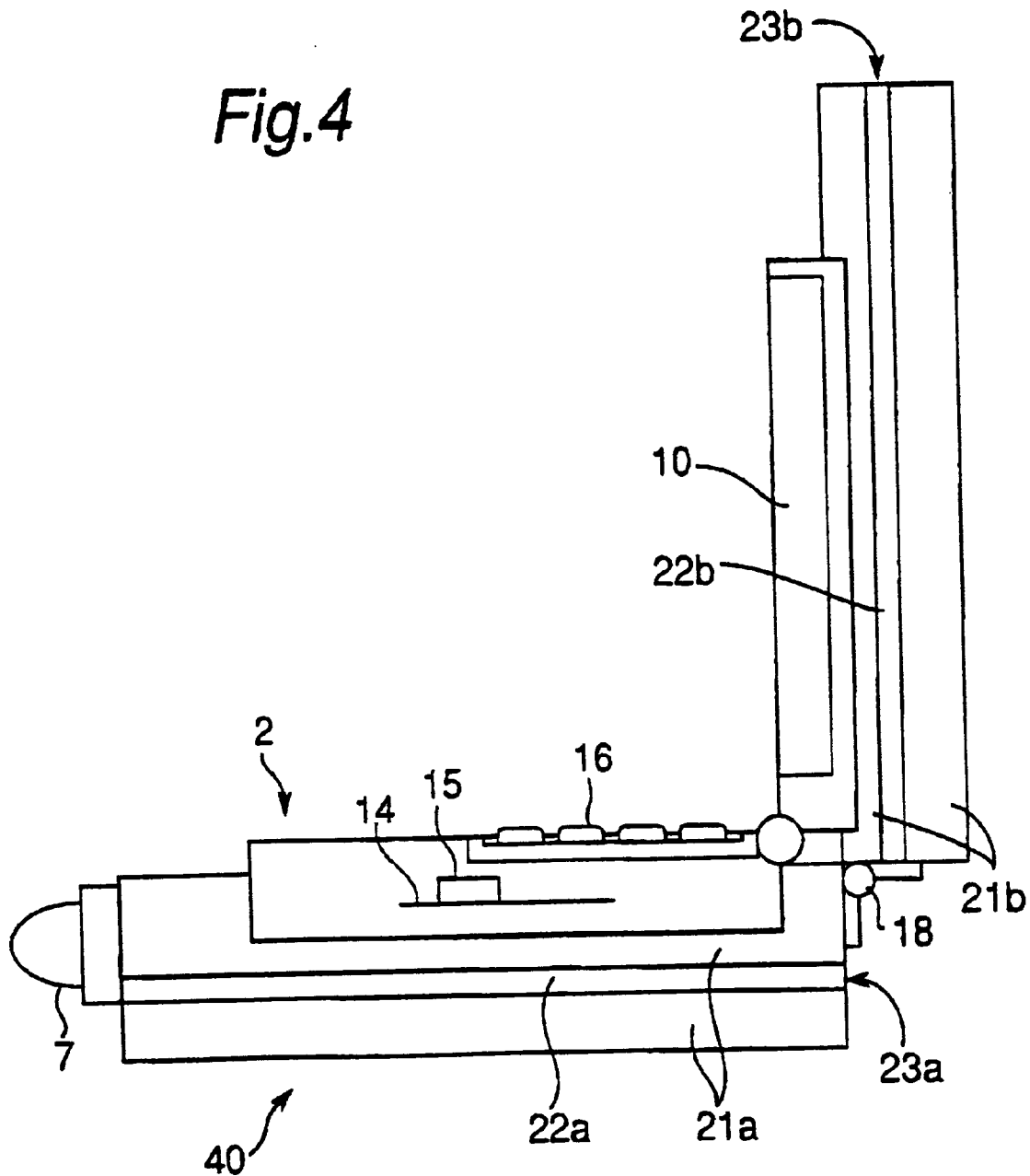
FIG. 4 is a side view cross section of a case according to a third embodiment of the present invention with a notebook computer stored therein.

FIG. 4 is a side sectional view of a case 40 according to a third embodiment of the present invention with the notebook computer 2 stored therein. Note that like parts in the case 40 according to the present embodiment and the case 1 according to the first embodiment are identified by like reference numerals, and further description thereof is omitted below.

This case 40 differs in that a composite material 21a and 21b made with a thermally conductive carbon fiber cloth and comprising an air space 22a and 22b is used as the shell material of the case 40 to lower the surface temperature of the case 40. A ventilation hole 23a and 23b is disposed at one end of each air space 22a and 22b.

As a result, heat generated by the CPU 15 mounted on the printed circuit board 14 inside the notebook computer 2 held in the case 40 is partially absorbed by and dissipated throughout the composite material 21a, and then vented from ventilation hole 23a through air space 22a. Heat generated by the LCD panel 10 is likewise absorbed by and dissipated throughout the composite material 21b, and then vented from ventilation hole 23b through air space 22b.

As a result, heat from the notebook computer 2 is prevented from building up inside the case 1, and the notebook computer 2 is prevented from overheating. The outside of the case 40 can also be prevented from becoming hot because the amount of heat conducted to the outside of the case 40 is reduced, and laptop use of the case 40 can thus be made more comfortable.

It should be noted that the air space disposed in the thermally conductive composite material is preferably located close to the notebook computer 2. It is also further preferable to have air spaces disposed in two or more layers.

Embodiment 4

Figure 5:
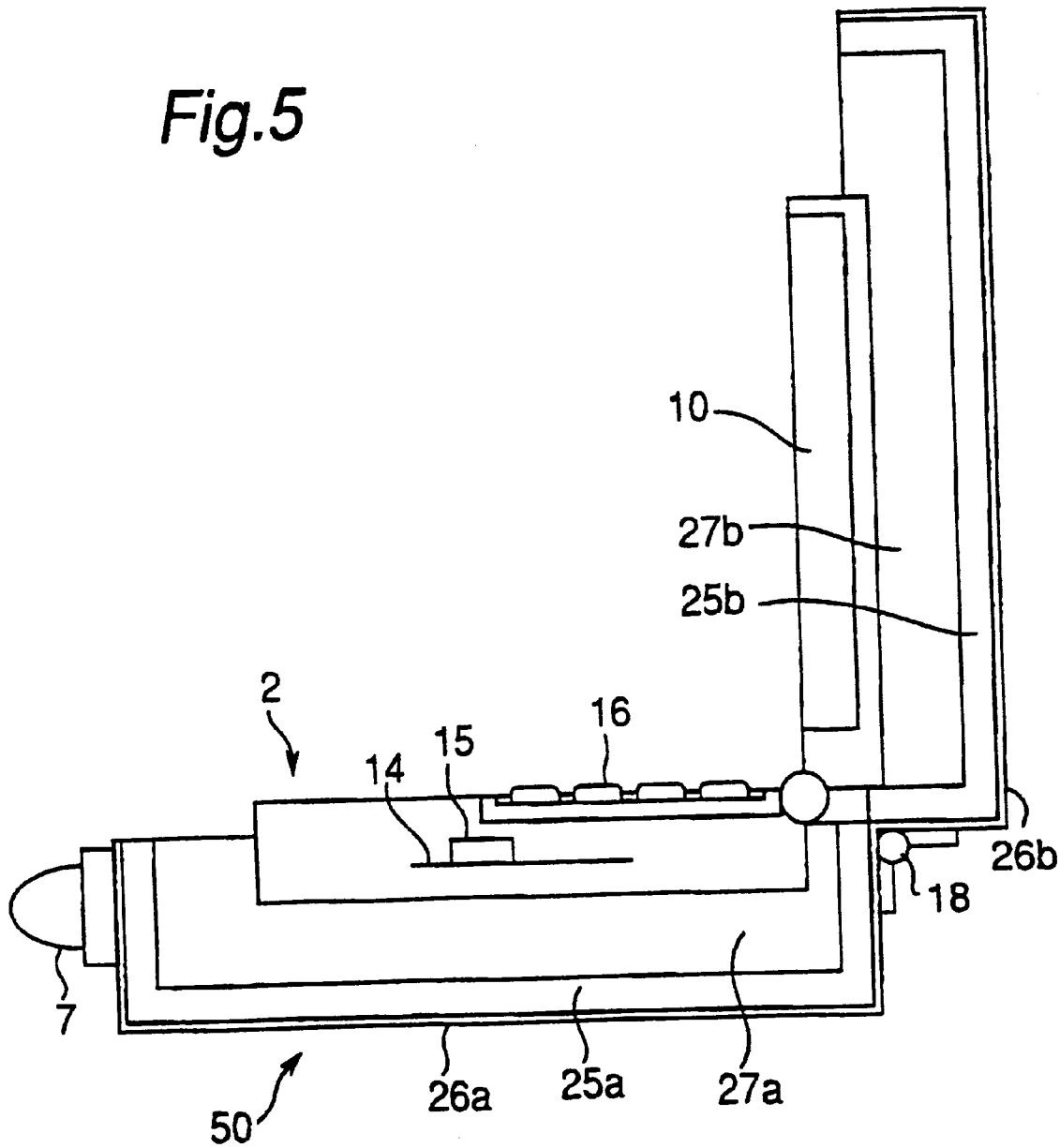
FIG. 5 is a side view cross section of a case according to a fourth embodiment of the present invention with a notebook computer stored therein.

FIG. 5 is a side sectional view of a case 50 according to a fourth embodiment of the present invention with a notebook computer 2 stored therein. Note that like parts in the case 50 according to the present embodiment and the case 1 according to the first embodiment are identified by like reference numerals, and further description thereof is omitted below.

This case 50 differs in that the surface of the shell 25a and 25b is coated with a high emissivity coating 26a and 26b having low absorptivity to the sunlight spectrum. An example this type of coating is silicon alkyd PV-100. It should be noted that substantially the same effect can be obtained with a common white paint such as that manufactured by Asahi Paint. By thus coating the shell exterior, heat from the cushioning material 27a heated by heat emitted from the CPU 15 mounted on the printed circuit board 14 inside the notebook computer 2 can be radiated outside the shell. When the case 50 is used outside, the coating also effectively prevents excessive heat build-up inside the case from exposure to the sun, and thus prevents overheating of the notebook computer 2.

It should be noted that the cushioning material 27 disposed inside the shell 25 is preferably a material with good thermal conductivity, and further preferably comprises one or more air spaces inside the cushioning material 27 with a ventilation hole on the hinge member 18 side of the case 50.

Embodiment 5

Figure 6:
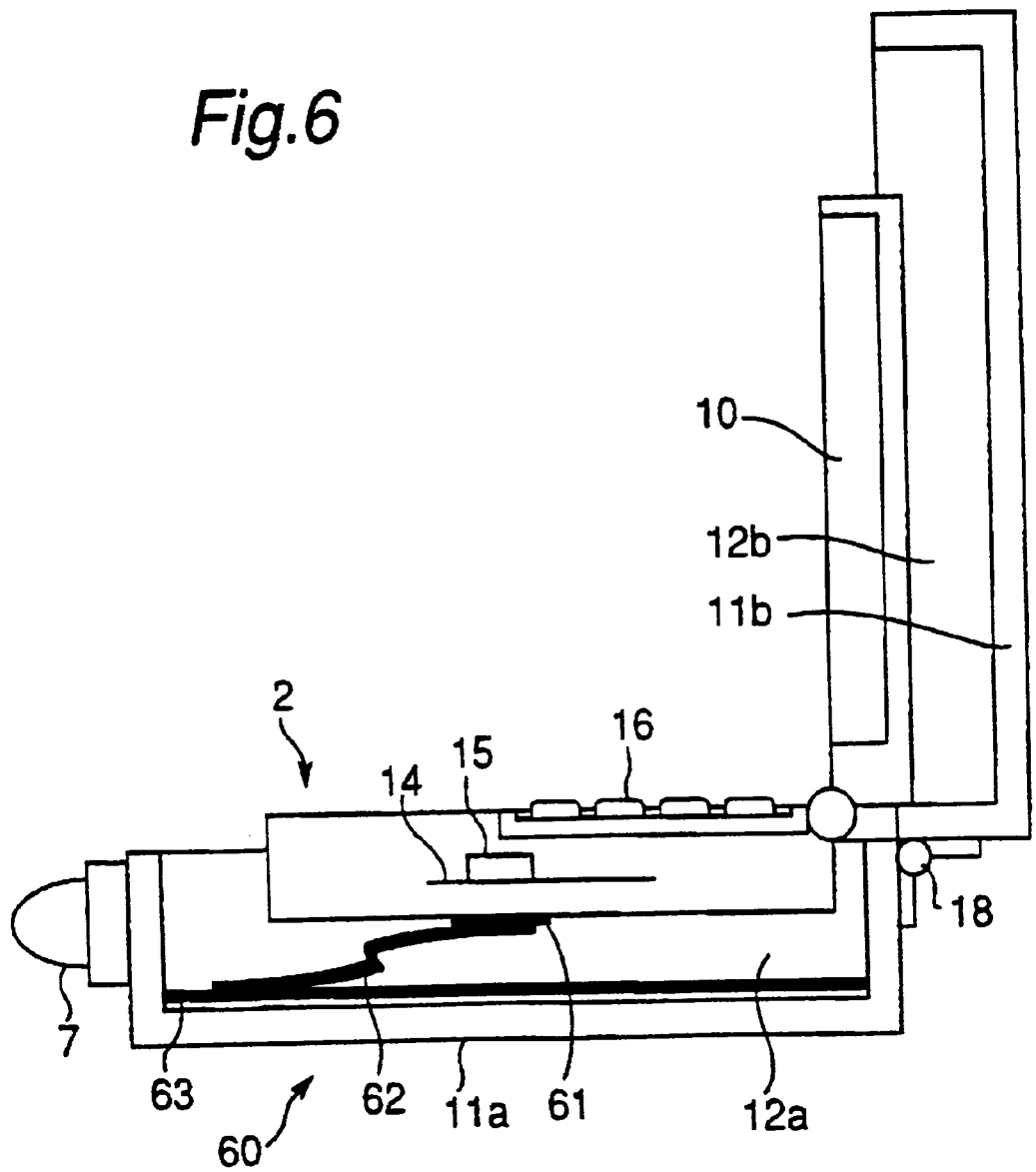
FIG. 6 is a side view cross section of a case according to a fifth embodiment of the present invention with a notebook computer stored therein.

FIG. 6 is a side sectional view of a case 60 according to a fifth embodiment of the present invention with the notebook computer 2 stored therein. Note that like parts in the case 60 according to the present embodiment and the case 1 according to the first embodiment are identified by like reference numerals, and further description thereof is omitted below.

This case 60 differs in that a thermally conductive heat collector 61 made, for example, of metal is disposed in cushioning material 12a on the inside of shell 11a at a position directly below the CPU 15 mounted on the printed circuit board 14 inside the notebook computer 2, that is, directly below the heat source. When the notebook computer 2 is placed in the case 60, this heat collector 61 contacts the outside of the notebook computer 2. Heat collected by the heat collector 61 is then conducted through the heat pipe 62 to a heat radiation member 63:

As a result, heat is prevented from building up in the cushioning material 12a, which is a poor heat conductor, and the notebook computer 2 is prevented from overheating.

An identical structure can also be provided in the cushioning material 12b inside shell 11b. in this case, heat generated by the LCD panel 10 can be prevented from building up in the cushioning material 12b, and the LCD panel 10 can be prevented from reaching a high temperature.

It will also be obvious that a material with good thermal conductivity can be used for cushioning material 12a and 12b in the present embodiment.

Embodiment 6

Figure 7:
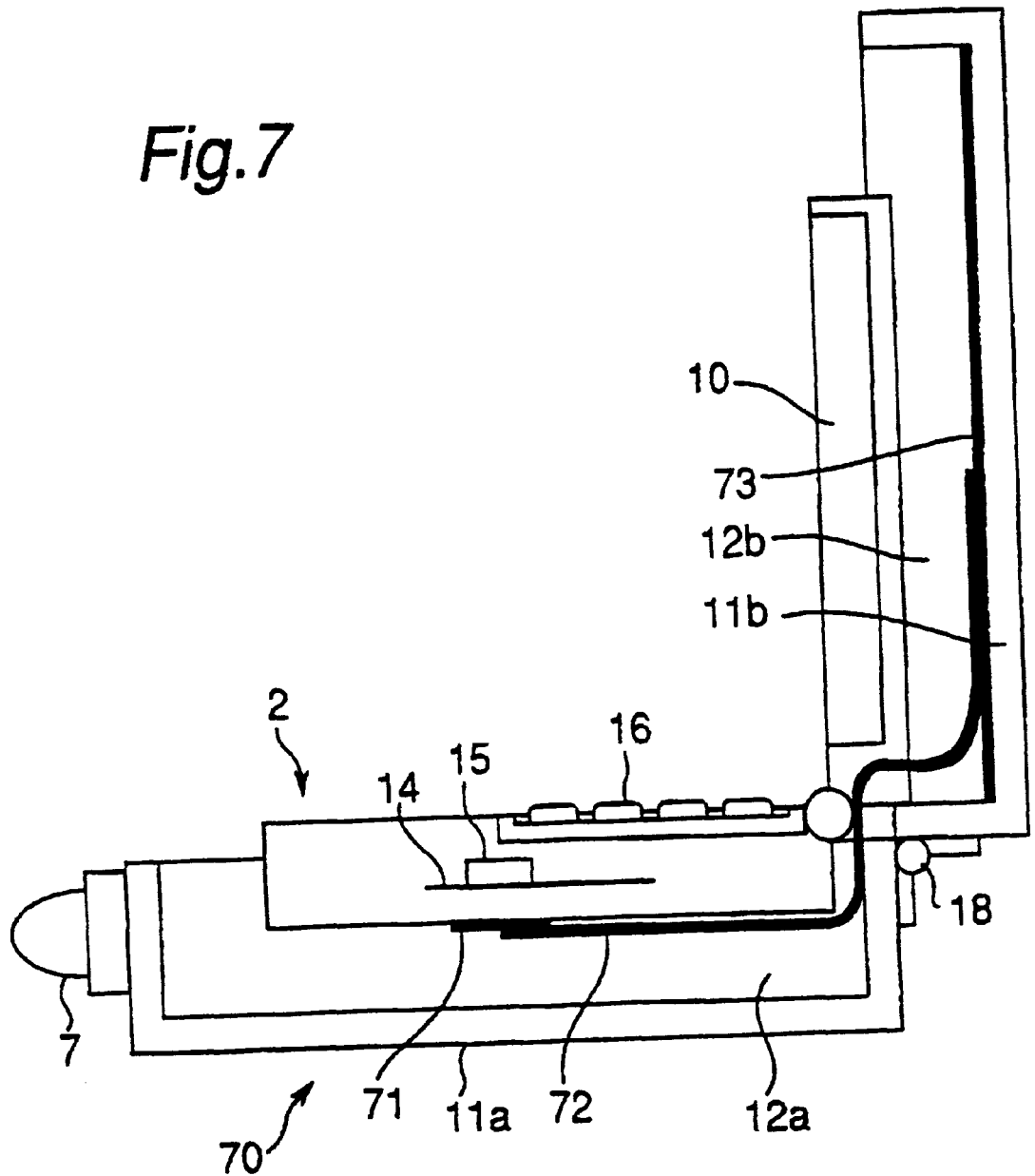
FIG. 7 is a side view cross section of a case according to a sixth embodiment of the present invention with a notebook computer stored therein.

FIG. 7 is a side sectional view of a case 70 according to a sixth embodiment of the present invention with the notebook computer 2 stored therein. Note that like parts in the case 70 according to the present embodiment and the case 1 according to the first embodiment are identified by like reference numerals, and further description thereof is omitted below.

This case 70 is similar to the case 60 according to the sixth embodiment in comprising a heat pipe, but differs in that the heat radiation member 73 is disposed in the top cover of the case 70. More specifically, a thermally conductive heat collector 71 made, for example, of metal is disposed in cushioning material 12*a* on the inside of shell 11*a* at a position directly below the CPU 15 mounted on the printed circuit board 14 inside the notebook computer 2, that is, directly below the heat source. When the notebook computer 2 is placed in the case 70, this heat collector 71 contacts the outside of the notebook computer 2. Heat collected by the heat collector 71 is then conducted through the heat pipe 72 to the heat radiation member 73. The heat radiation member 73 in this embodiment is disposed on the inside of the shell 11*b* behind the LCD panel 10.

As a result, the notebook computer 2 is prevented from heating up to a high temperature. The shell 11*a* contacting the legs when the case 70 is used held on the lap can also be prevented from heating up to a high temperature, and such use on the lap can thus be made more comfortable.

It will also be obvious that a material with good thermal conductivity can be used for cushioning material 12*a* and 12*b* in the present embodiment.

It will also be obvious that a heat collector can also be disposed at a position in contact with the LCD panel 10 with heat emitted by the LCD panel 10 conducted through a heat pipe to the heat radiation member 73. In this case, heat from the LCD panel 10 can be prevented from building up inside the cushioning material 12*b*, and the LCD panel 10 can be prevented from heating up to a high temperature.

Embodiment 7

Figure 8:
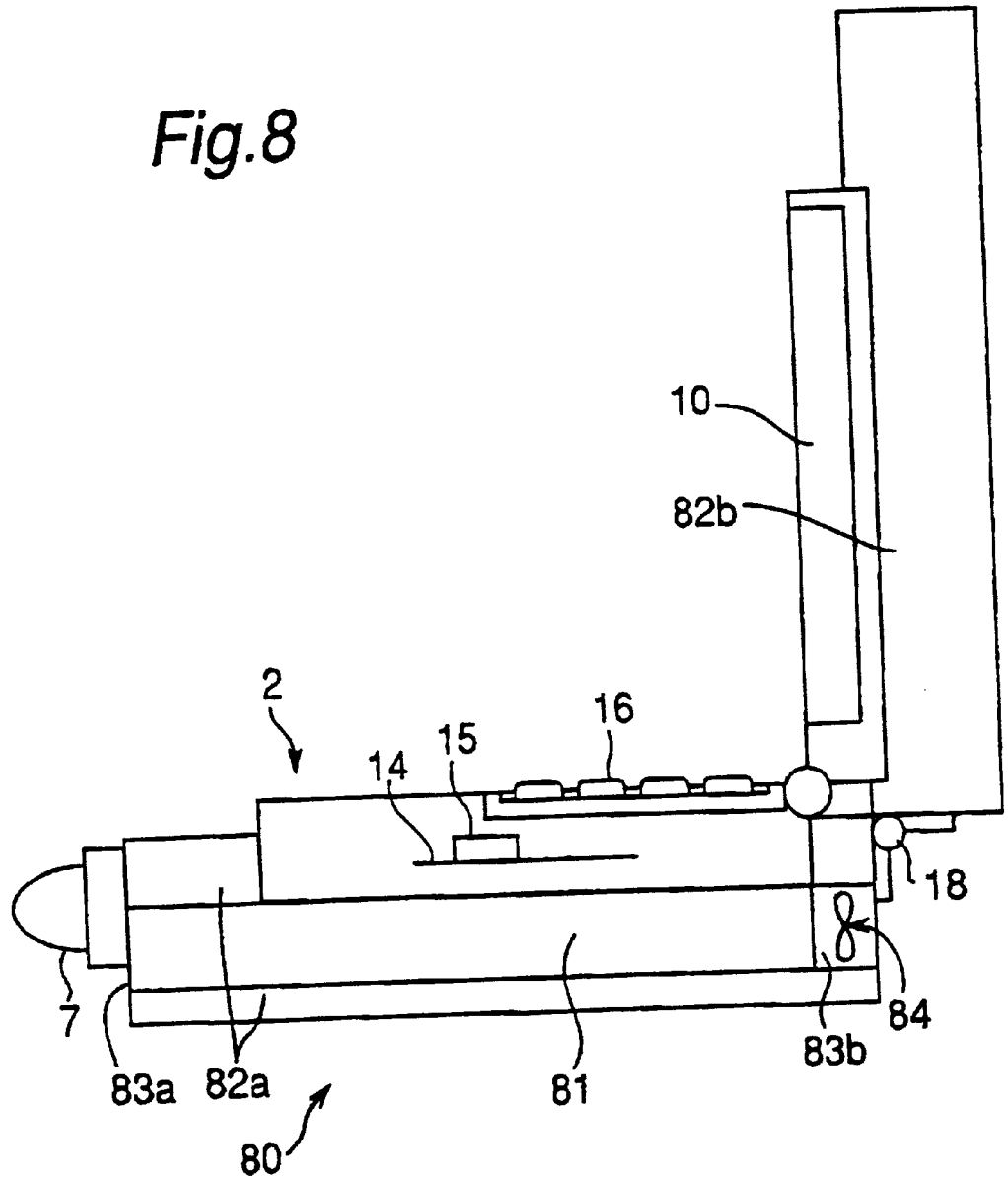
FIG. 8 is a side view cross section of a case according to a seventh embodiment of the present invention with a notebook computer stored therein.

FIG. 8 is a side sectional view of a case 80 according to a seventh embodiment of the present invention with the notebook computer 2 stored therein. Note that like parts in the case 80 according to the present embodiment and the case 1 according to the first embodiment are identified by like reference numerals, and further description thereof is omitted below.

The case 80 according to the present embodiment comprises a cavity 81 in a composite material 82*a* used for the shell at a position in contact with the bottom of the notebook computer 2. Ventilation holes 83*a* and 83*b* are provided at both ends of the cavity 81. A fan 84 is disposed to a ventilation hole 83*b* on the hinge member 18 side of the case 80.

Heat emitted by the CPU 15 mounted on a printed circuit board 14 inside the notebook computer 2 is thus conducted directly to the cavity 81. Heat in the cavity 81 is then expelled from the cavity 81 through the ventilation hole 83*a* by operation of the fan 84.

As a result, the notebook computer 2 is prevented from heating up to a high temperature. The part of the shell 82*a* contacting the legs when the case 80 is used held on the lap can also be prevented from heating up to a high temperature, and such use on the lap can thus be made more comfortable.

It will also be obvious that a similar structure can also be disposed in composite material 82*b*. In this case, heat emitted from the LCD panel 10 is dissipated by the composite material 82*b*, and the LCD panel 10 can be prevented from heating up to a high temperature. As a result, a composite material with good thermal conductivity is preferably used.

Embodiment 8

Figure 9:
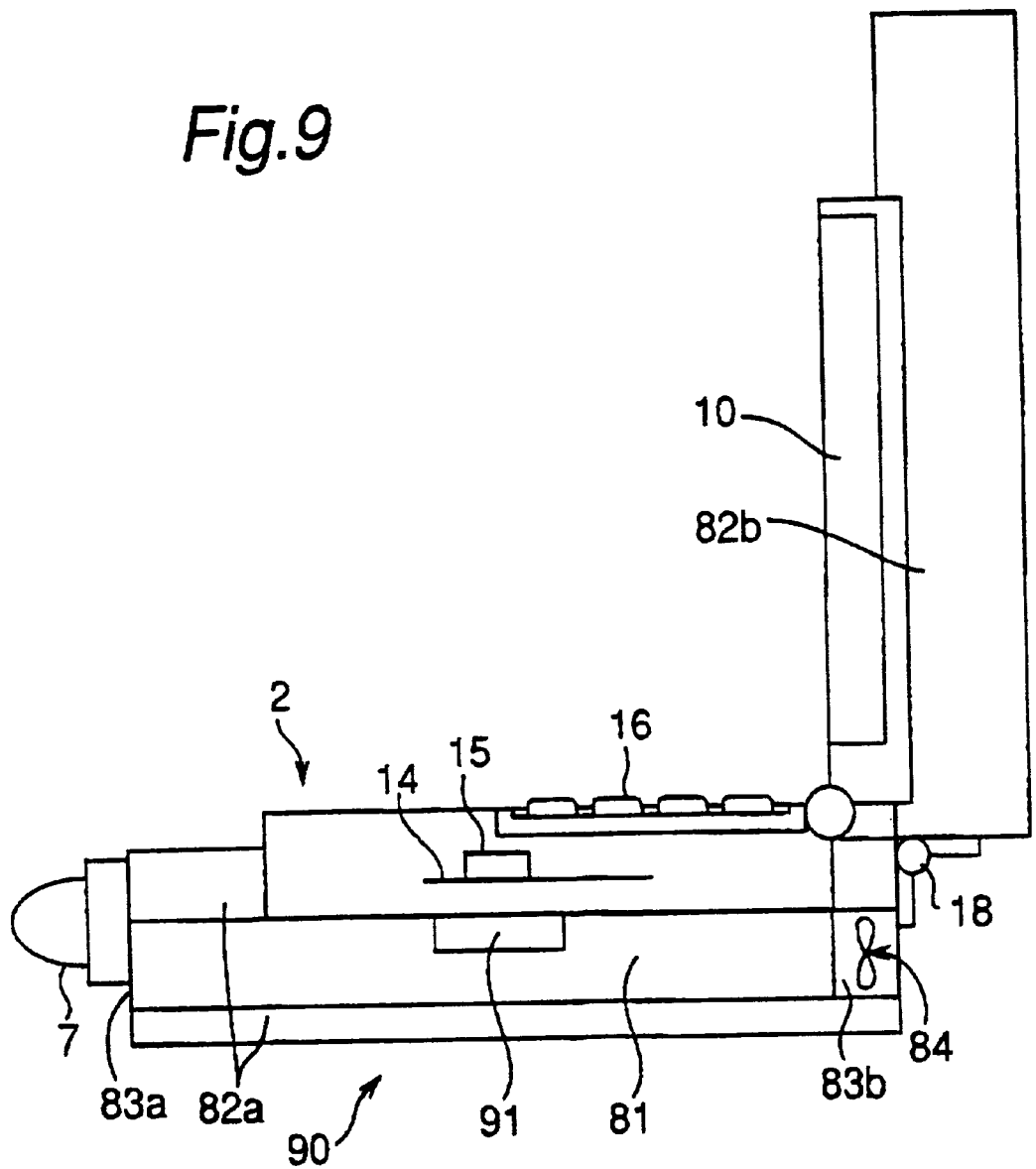
FIG. 9 is a side view cross section of a case according to a eighth embodiment of the present invention with a notebook computer stored therein.

FIG. 9 is a side sectional view of a case 90 according to an eighth embodiment of the present invention with the notebook computer 2 stored therein. Note that like parts in the case 90 according to the present embodiment and the case 80 according to the seventh embodiment are identified by like reference numerals, and further description thereof is omitted below.

The case 90 according to the present embodiment comprises a cavity 81 in a composite material 82*a* used for the shell at a position in contact with the bottom of the notebook computer 2. A Peltier element 91 is disposed as a cooling device at a position directly below the CPU 15, that is, below the heat source. As a result, the notebook computer 2 is prevented from heating up to a high temperature. The part of the shell 82*a* contacting the legs when the case 90 is used held on the lap can also be prevented from heating up to a high temperature, and such use on the lap can thus be made more comfortable.

It will also be obvious that a similar structure can also be disposed in composite material 82*b*. In this case, heat emitted from the LCD panel 10 is dissipated by the composite material 82*b*, and the LCD panel 10 can be prevented from heating up to a high temperature. As a result, a composite material with good thermal conductivity is preferably used.

Embodiment 9

Figure 10:
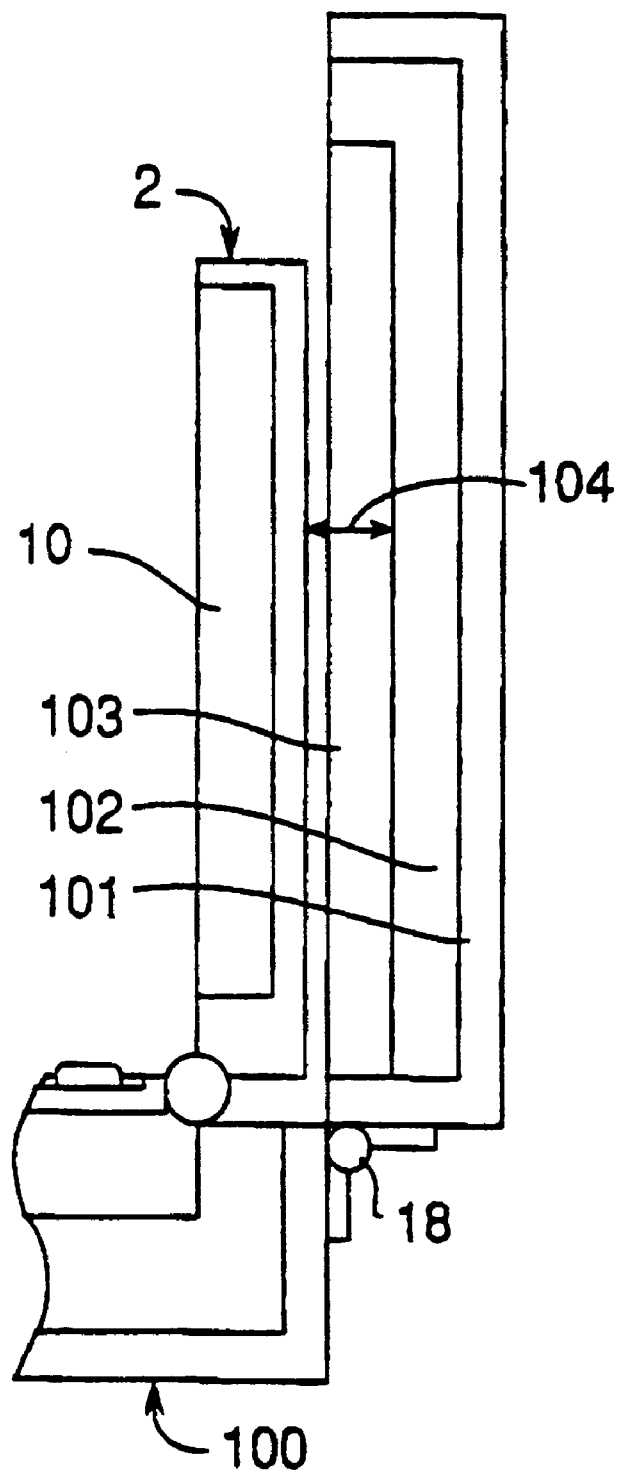
FIG. 10 is a side view cross section of a case according to a ninth embodiment of the present invention with a notebook computer stored therein.

FIG. 10 is a side sectional view of a case 100 according to a ninth embodiment of the present invention with the notebook computer 2 stored therein. Note that like parts in the case 100 according to the present embodiment and the case 1 according to the first embodiment are identified by like reference numerals, and further description thereof is omitted below.

The case 100 according to the present embodiment comprises an empty space 103 between the cushioning material 102 on the inside of the case shell 101, and the LCD panel 10. By providing this empty space 103, a space with the depth indicated by arrow 104 is formed between the LCD panel 10 and cushioning material 102. Heat emitted from the LCD panel 10 is released outside from this space. Note that the structure of the case 100 on the side below the main part of the notebook computer 2 can be that of any of the preceding embodiments 1 through 8.

Embodiment 10

Figure 11:
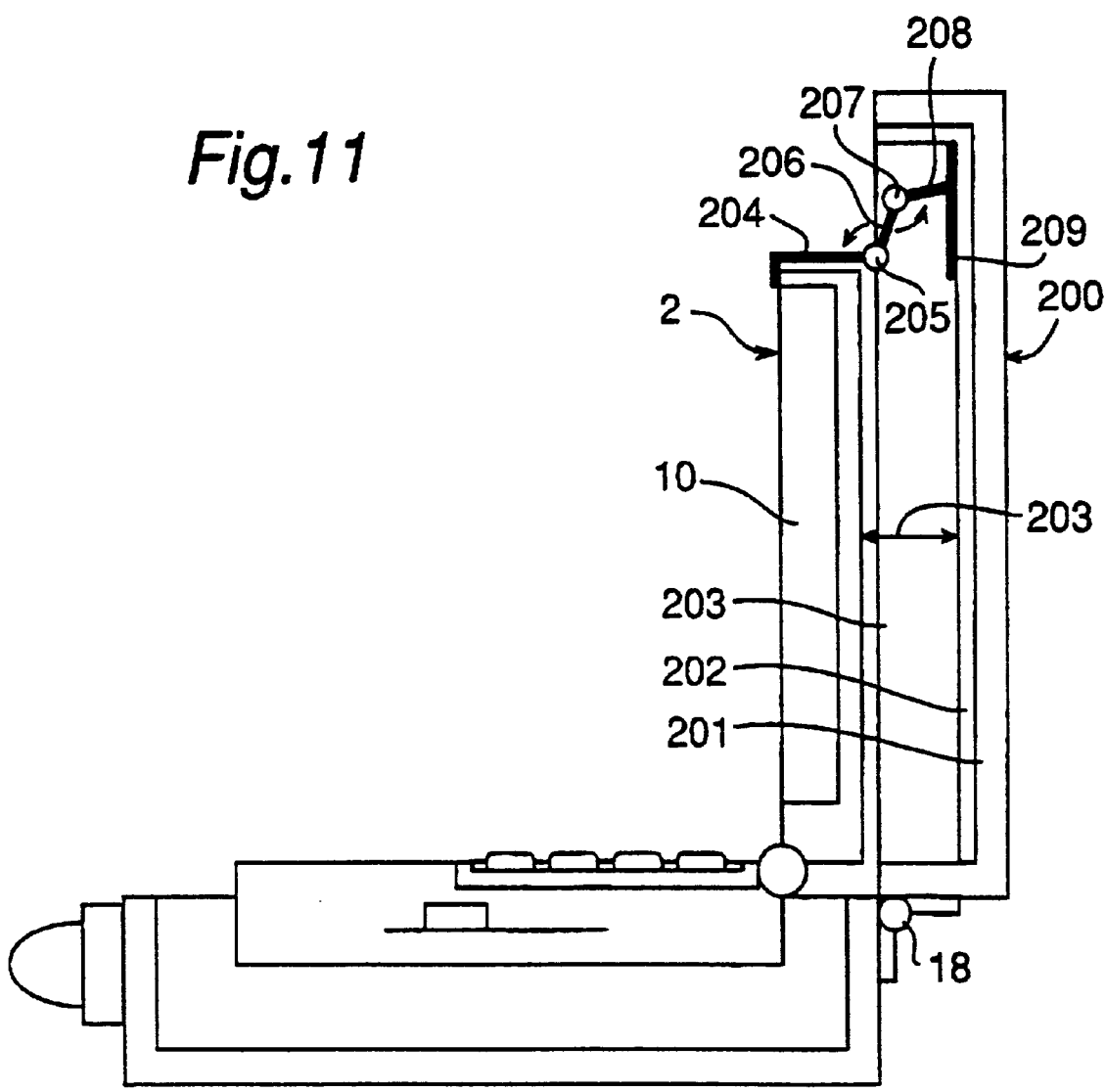
FIG. 11 is a side view cross section of a case according to a tenth embodiment of the present invention with a notebook computer stored therein.

FIG. 11 is a side sectional view of a case 200 according to a tenth embodiment of the present invention with the notebook computer 2 stored therein. Note that like parts in the case 200 according to the present embodiment and the case 1 according to the first embodiment are identified by like reference numerals, and further description thereof is omitted below.

The case 200 according to the present invention comprises an empty space 203 between the LCD panel 10 and the cushioning material 202 on the inside of the case shell 201, and a linking structure 204 to 209 for connecting the LCD panel 10 and shell 201.

This linking structure comprises an angle 204, links 206 and 208, hinges 205 and 207 for connecting angle 204 and links 206 and 208, and a guide rail 209.

One end of the angle 204 is hooked on the front surface of the LCD panel 10, and is preferably fastened thereto with an adhesive. The angle 204 and one link 206 are rotatably connected by a hinge 205, and are pushed in a counterclockwise direction. The link 208 and link 206 are also rotatably connected by a hinge 207, and are also pushed in a counterclockwise direction. Link 208 is fastened to shell 201 of the case by means of the guide rail 209 in a manner enabling the link 208 to slide on the guide rail 209 up and down as seen in the figure.

Figure 12:
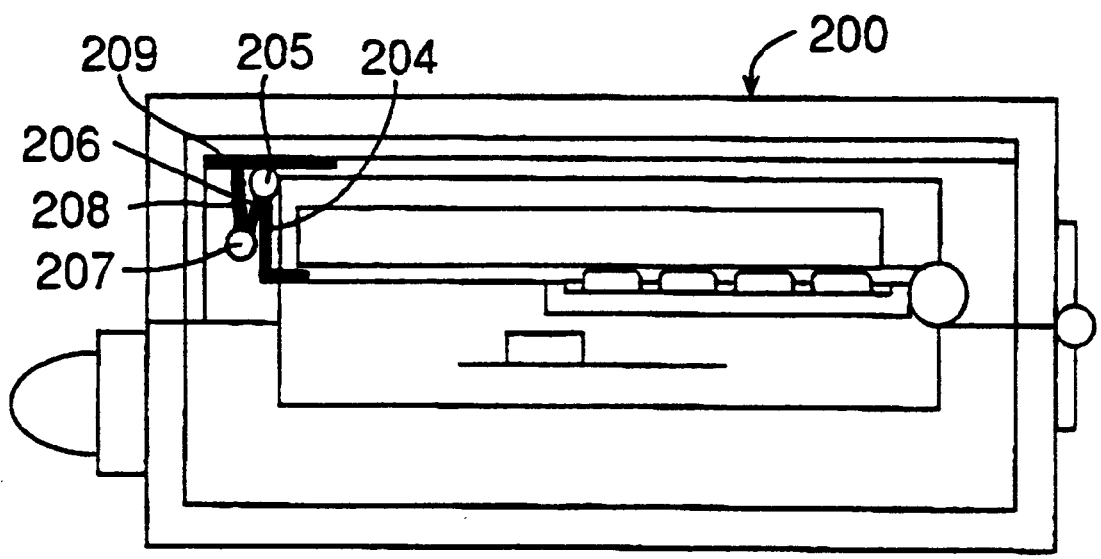
FIG. 12 is a side view cross section of a case according to a tenth embodiment of the present invention when the case is closed.

FIG. 12 is a side sectional view of the case 200 when closed. When the top of the case 200 is closed, links 206 and 208 are folded up by the hinges 205 and 207, and the LCD panel 10 is housed in the empty space 203. When the cover is again opened, the LCD panel 10 is reopened with the cover because the front of the LCD panel 10 is held by the angle 204.

Figure 13:
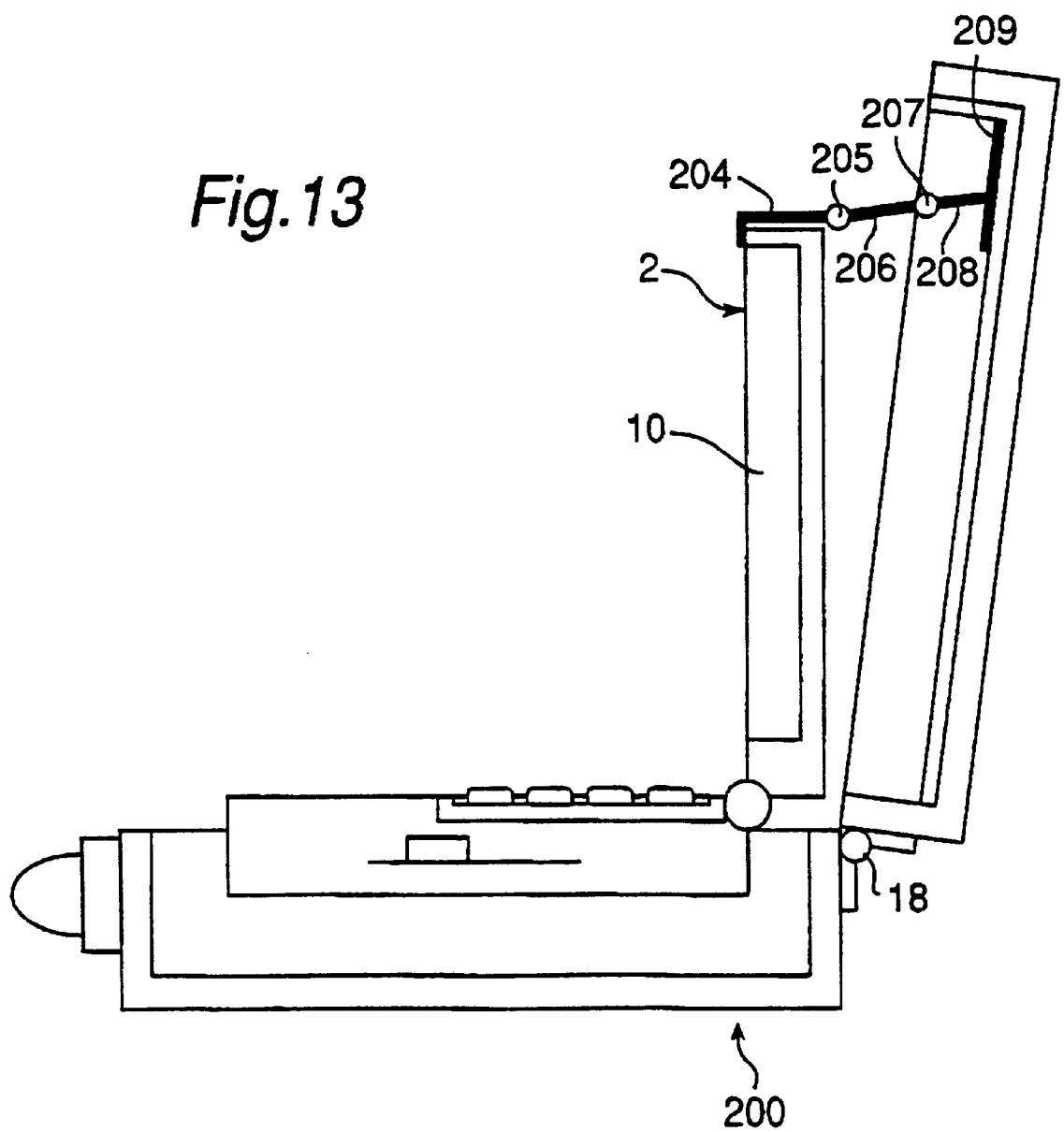
FIG. 13 is a side view cross section of a case according to a tenth embodiment of the present invention when the case is fully open.

FIG. 13 is a side sectional view of the case 200 when the cover is opened until the links 206 and 208 are straight. Link 208 is fastened to the guide rail 209 in a manner enabling the link 208 to slide on the guide rail 209 up and down as seen in the figure. As a result, the cover can be opened yet further after the links 206 and 208 have been fully extended.

Figure 14A:
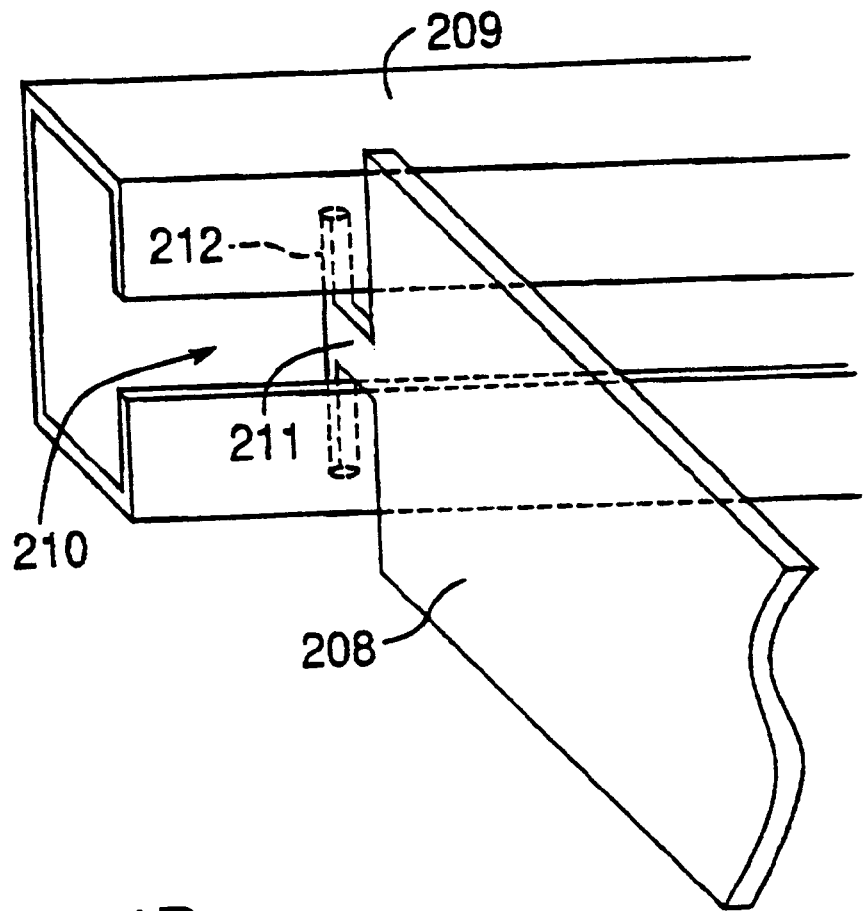
FIGS. 14A and 14B are close-up views of the area around a guide rail in a case according to said tenth embodiment of the invention, respectively.
Figure 14B:
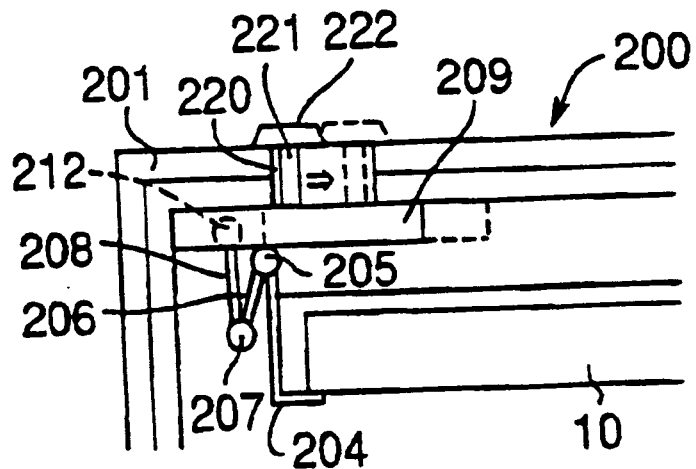
Figure 15:
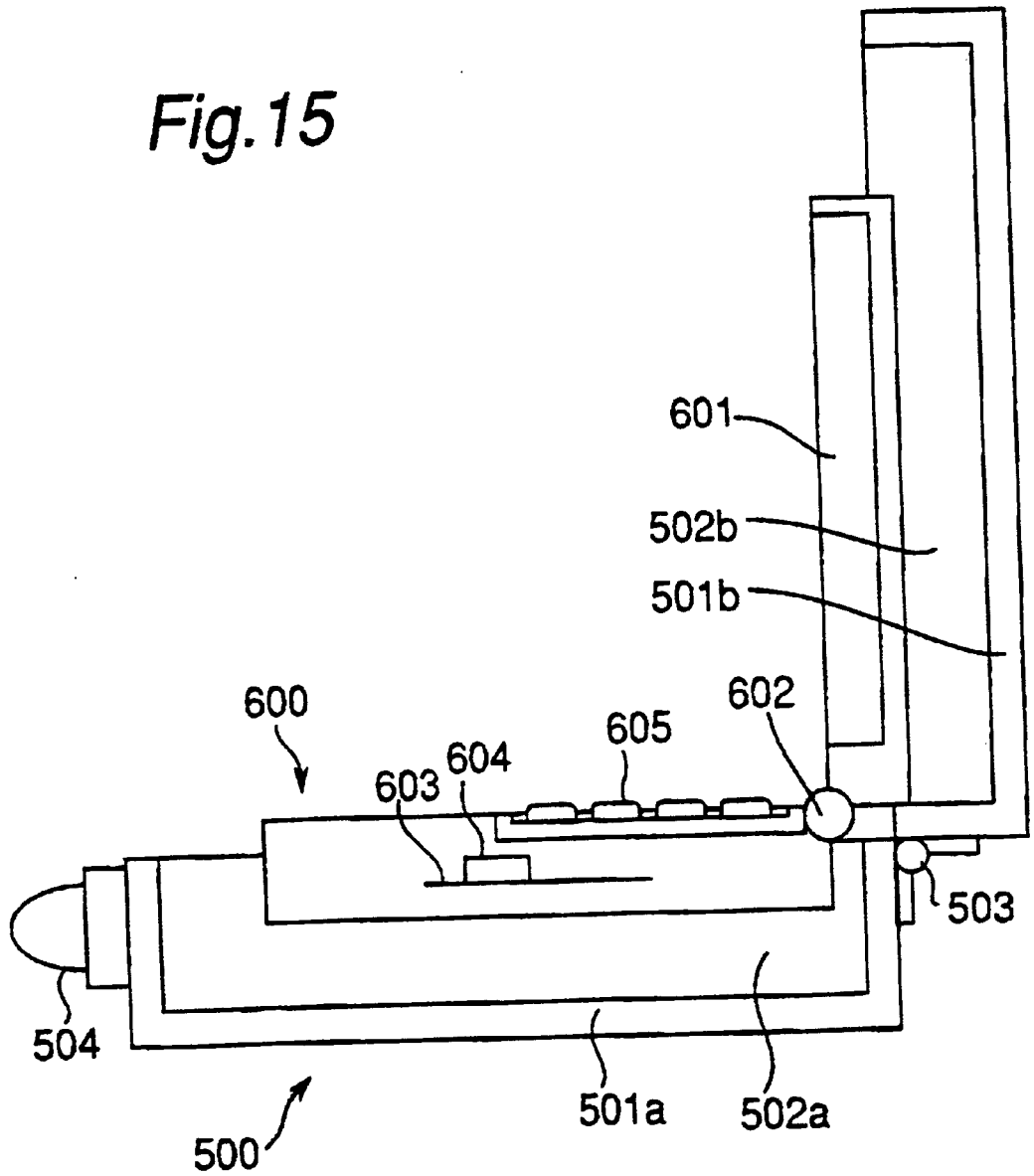
FIG. 15 is a side view cross section of the prior art carrying case with the notebook computer placed inside said case.

FIGS. 14A and 14B are close-up views of the area around the guide rail 209. As shown in FIG. 14A, the guide rail 209 is a hollow rectangular rail with a slot 210 extended from left to right in the view shown in FIG. 14. A key comprising a member 211 passing through the slot 210 and a member 212 perpendicular thereto and with a width greater than that of the slot 210 is provided on the end of the link 208. As a result, the link 208 can be connected to and held in the guide rail 209 while remaining free to slide along the guide rail 209.

It should be noted that, as shown in FIG. 14B, it is alternatively possible to provide a channel 220 in the shell 201 of the case 200, connect a rod member 221 and sliding button 222 to the guide rail 209, and bond the angle 204 to the LCD panel 10. The guide rail 209 can thus be slid in the direction of the arrow by means of sliding button 222 located externally to the case 200. As a result, when the cover of a case 200 thus comprised is closed, the sliding button 222 and guide rail 209 can slide to the right as seen in FIG. 14B to a position as indicated by the dotted lines, thereby disconnecting member 212 of the link 208 from the guide rail 209. Then, when the cover is next opened, the cover can be opened independently of the LCD panel 10. When the cover of the case 200 is then closed, the sliding button 222 can slide to the left as shown in the figure to again hook member 212 of the link 208 on the guide rail 209. Then, when the cover is next opened, the cover and LCD panel 10 can be opened simultaneously.

Note that the structure of the case 200 on the side below the main part of the notebook computer 2 can be that of any of the preceding embodiments 1 through 8.

The invention being thus described, it will be obvious that the same may be varied in many ways Such variations are not to be regarded as a departure from the spirit and scope of the invention, and all such modifications as would be obvious to one skilled in the art are intended to be included within the scope of the following claims.

What is claimed is:

1. A notebook computer storage case for housing a notebook computer, said case comprising:

a case top and a case bottom hingedly attached to each other;

a cushioning member in said case bottom and having a recess for receiving a notebook computer;

an inner member of a material with a higher thermal conductivity than said cushioning member for contacting a bottom surface of a notebook computer located in the recess in said cushioning member; and an outer shell made of a material with a higher thermal conductivity than said cushioning member for dispersing heat generated by a notebook computer located in the recess in said cushioning member and transmitted from said inner member through said cushioning member to said outer shell.

2. A notebook computer storage case for housing a notebook computer, said case comprising;

a case top and a case bottom hingedly attached to each other;

an inner member for contacting a bottom surface of a notebook computer located in said case bottom;

an outer shell for dispersing heat generated by a notebook computer located in said case bottom;

at least one air space layer disposed between said inner member and said outer shell, the air space layer being parallel to a bottom of said case and having a ventilation opening in an end of said case bottom.

3. A notebook computer storage case for housing a notebook computer, said case comprising:

a case top and a case bottom hingedly attached to each other;

a heat collector disposed inside said case bottom, inside an exterior shell of said case for contacting a heat-emitting part of a notebook computer located in said case bottom;

a heat pipe inside said case bottom for conducting heat collected by said heat collector; and a heat radiator connected to said heat pipe and located inside of said case for radiating heat outside of said case.

4. The notebook computer storage case according to claim 3, wherein said heat radiator is disposed in said case top.

5. The notebook computer storage case according to claim 3, further comprising, disposed on an exterior surface of said case, a coating with a high reflectivity and low absorption index to light in the sunlight spectrum.

6. The notebook computer storage case according to claim 3, comprising a hollow member inside of said case top, providing a gap between said case top and a display panel of a notebook computer located in said case.

7. The notebook computer storage case according to claim 3, comprising a mechanism attached to said case top for opening and closing a cover of a notebook computer located in said case in conjunction with opening and closing of said case top relative to said case bottom.

8. The notebook computer storage case according to claim 3, comprising a clutch mechanism in a hinge hingedly connecting said case bottom and said case top.

9. A notebook computer storage case for housing a notebook computer, said case comprising:

a case top and a case bottom hingedly attached to each other;

a member disposed inside said case bottom for contacting and supporting a notebook computer located in said case bottom, said member including a cavity adjacent a bottom surface of a notebook computer located in said case, the cavity having an air outlet; and a fan for expelling air from inside the cavity and through the air outlet.

10. The notebook computer storage case according to claim 9, comprising, in the cavity, a cooling device located directly opposite a heat emitting part of a notebook computer located in said case.

11. The notebook computer storage case according to claim 9, further comprising, disposed on an exterior surface of said case, a coating with a high reflectivity and low absorption index to light in the sunlight spectrum.

12. The notebook computer storage case according to claim 9, comprising a hollow member inside of said case top, providing a gap between said case top and a display panel of a notebook computer located in said case.

13. The notebook computer storage case according to claim 9, comprising a mechanism attached to said case top for opening and closing a cover of a notebook computer located in said case in conjunction with opening and closing of said case top relative to said case bottom.

14. The notebook computer storage case according to claim 9, comprising a clutch mechanism in a hinge hingedly connecting said case bottom and said case top.

15. The notebook computer storage case according to claim 1 wherein the cushioning member is silicone rubber.

16. The notebook computer storage case according to claim 2 wherein said inner member and said outer shell are carbon fiber cloth.

* * * * *